US007358851B2

(12) United States Patent
Patenaude et al.

(10) Patent No.: US 7,358,851 B2
(45) Date of Patent: Apr. 15, 2008

(54) METHOD AND SYSTEM FOR DEMONSTRATING VEHICLE FEATURES AND VEHICLE PROMOTIONS

(75) Inventors: Russell A. Patenaude, Macomb Township, MI (US); Shpetim S. Veliu, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 210 days.

(21) Appl. No.: 11/173,094

(22) Filed: Jul. 1, 2005

(65) Prior Publication Data

US 2007/0001876 A1 Jan. 4, 2007

(51) Int. Cl.
*B60Q 1/00* (2006.01)
(52) U.S. Cl. ............................ 340/438; 701/29; 705/14
(58) Field of Classification Search ................ 340/438, 340/439, 825.31, 825.69, 425.5; 705/14; 701/33, 29; 455/99
See application file for complete search history.

(56) References Cited

U.S. PATENT DOCUMENTS

| 5,422,624 | A | * | 6/1995 | Smith ........................... 340/438 |
| 5,479,157 | A | * | 12/1995 | Suman et al. ............... 340/5.28 |
| 5,970,390 | A | | 10/1999 | Koga et al. |
| 6,493,546 | B2 | | 12/2002 | Patsiokas |
| 6,680,674 | B1 | * | 1/2004 | Park ............................. 340/905 |
| 6,950,638 | B2 | | 9/2005 | Videtich et al. |
| 6,978,152 | B1 | | 12/2005 | Yamaashi et al. |
| 7,139,659 | B2 | * | 11/2006 | Mbekeani et al. ........... 701/117 |
| 2001/0035817 | A1 | * | 11/2001 | Mizuta ........................ 340/438 |
| 2001/0037210 | A1 | | 11/2001 | Hirayama |
| 2001/0037378 | A1 | | 11/2001 | Hirayama |
| 2002/0004747 | A1 | * | 1/2002 | Nishioka ........................ 705/14 |
| 2002/0103583 | A1 | * | 8/2002 | Ohmura et al. ................ 701/33 |
| 2003/0163233 | A1 | * | 8/2003 | Song et al. ..................... 701/33 |
| 2003/0194977 | A1 | | 10/2003 | Videtich et al. |
| 2003/0203714 | A1 | | 10/2003 | Videtich et al. |
| 2003/0236075 | A1 | | 12/2003 | Johnson et al. |
| 2004/0121748 | A1 | | 6/2004 | Glaza |
| 2004/0142659 | A1 | | 7/2004 | Oesterling et al. |
| 2004/0192404 | A1 | | 9/2004 | Zenios et al. |
| 2005/0038596 | A1 | * | 2/2005 | Yang et al. .................. 701/200 |
| 2005/0049002 | A1 | | 3/2005 | White et al. |
| 2005/0136902 | A1 | | 6/2005 | Mazzara |
| 2006/0040609 | A1 | | 2/2006 | Petschke et al. |
| 2006/0046649 | A1 | | 3/2006 | Videtich |
| 2006/0057956 | A1 | | 3/2006 | Grau et al. |

* cited by examiner

*Primary Examiner*—Brent A. Swarthout (57) ABSTRACT

A method for dynamically demonstrating vehicle features and vehicle promotions. The method involves a telematics unit receiving a broadcast over a wireless channel wherein the broadcast includes commercial information associated with at least one of the vehicle features and the vehicle promotions, filtering the broadcast to yield demonstration information which is at least a portion of the commercial information, and presenting the filtered demonstration information in an audio format and/or a video format.

21 Claims, 8 Drawing Sheets

METHOD AND SYSTEM FOR DEMONSTRATING VEHICLE FEATURES AND VEHICLE PROMOTIONS

FIELD OF THE INVENTION

The present invention generally relates to a demonstration of vehicle features and vehicle promotions.

BACKGROUND OF THE INVENTION

Inclusion of wireless communication systems within mobile vehicles provides an opportunity to communicate between the vehicle and a central location. For example, an operator of such a vehicle may subscribe to an in-vehicle messaging service that enables the subscriber to pull information from the central location via the wireless connection (e.g., a cellular connection and or a short-range 802.11 connection) and enables the central location to push information to the subscriber via the wireless connection.

Currently, a central location will push information to the subscriber via the wireless connection based on a subscriber identification or a vehicle identification number ("VIN") of the subscriber's vehicle. A drawback to this approach is the central location must be able to identify and manage some form of identification for each subscriber. Furthermore, a mass communication involving a significant number of subscribers will require a significant number of transmissions on the part of the central location.

The present invention overcomes these disadvantages and advances the state of the art vehicle demonstrations.

SUMMARY OF THE INVENTION

One aspect of the present invention provides a method for dynamically demonstrating vehicle features and vehicle promotions. The method comprises receiving a broadcast over a wireless channel, wherein the broadcast includes commercial information associated with at least one of the vehicle features and the vehicle promotions from the broadcast. The method further comprises a filtering of the commercial information to yield demonstration information, wherein the demonstration information is at least a portion of the commercial information, and a presentation of the filtered demonstration information in at least one of an audio format and a video format.

Another aspect of the invention provides a computer readable medium for dynamically demonstrating vehicle features and vehicle promotions. The computer readable medium comprises computer readable code for receiving a broadcast over a wireless channel, wherein the broadcast includes commercial information associated with at least one of the vehicle features and the vehicle promotions from the broadcast. The computer readable medium further includes computer readable code for filtering the broadcast to yield demonstration information, wherein the demonstration information is at least a portion of the commercial information, and computer readable code for presenting the filtered demonstration information in at least one of an audio format and a video format.

Another aspect of the invention provides a system for dynamically demonstrating vehicle features and vehicle promotions. The system comprises means for receiving a broadcast over a wireless channel, wherein the broadcast includes commercial information associated with at least one of the vehicle features and the vehicle promotions from the broadcast. The system further comprises means for filtering the broadcast to yield demonstration information, wherein the demonstration information is at least a portion of the commercial information, and means for presenting the filtered demonstration information in at least one of an audio format and a video format.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

DETAILED DESCRIPTION OF THE PREFERRED EMBODIMENTS

Figure 1:
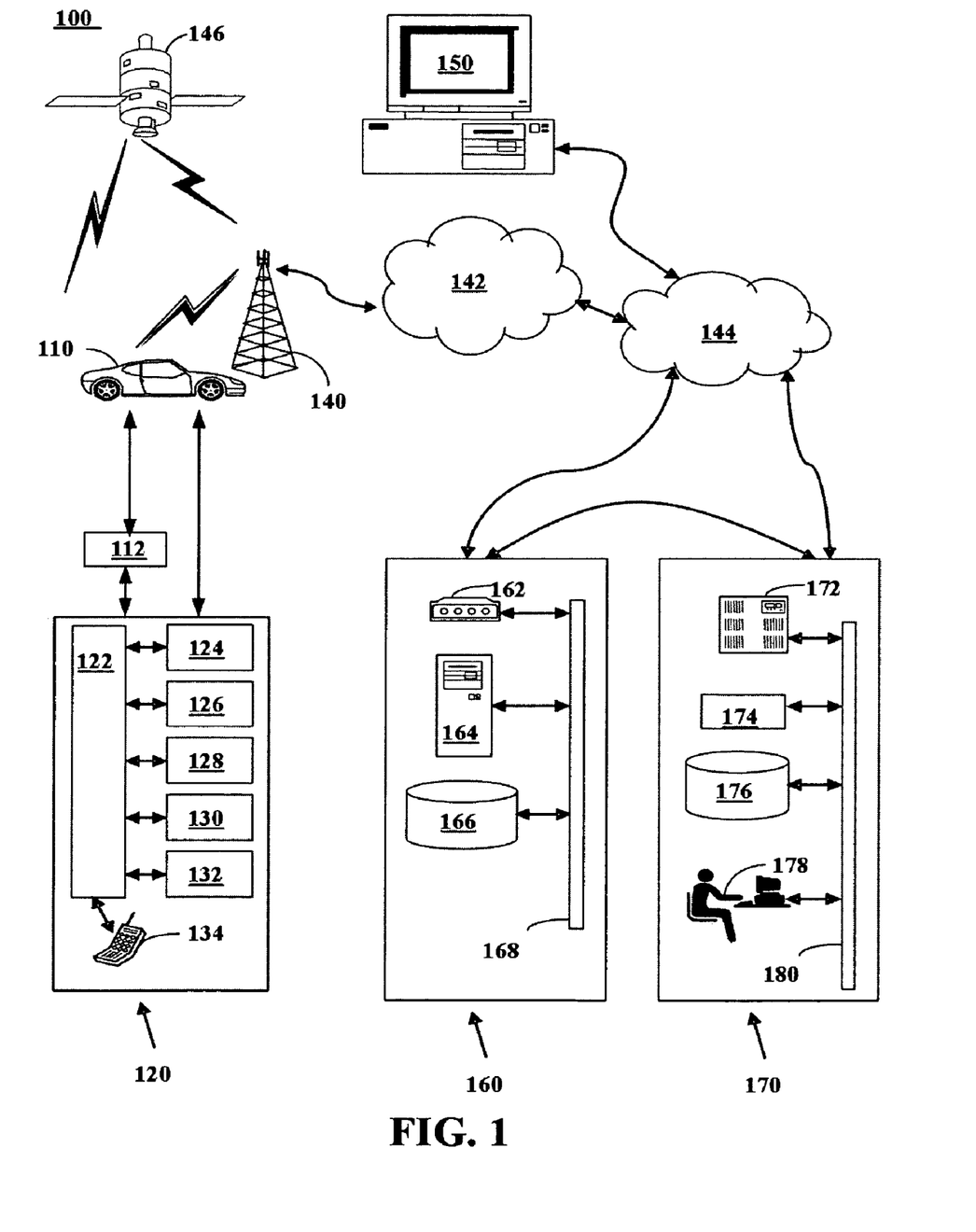
FIG. 1 illustrates an operating environment for a method for establishing communication with a mobile vehicle.

FIG. 1 illustrates an operating environment for a mobile vehicle communication system ("MVCS") 100. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112, sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. For example, communication services manager 174 may include at least one digital and/or analog modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
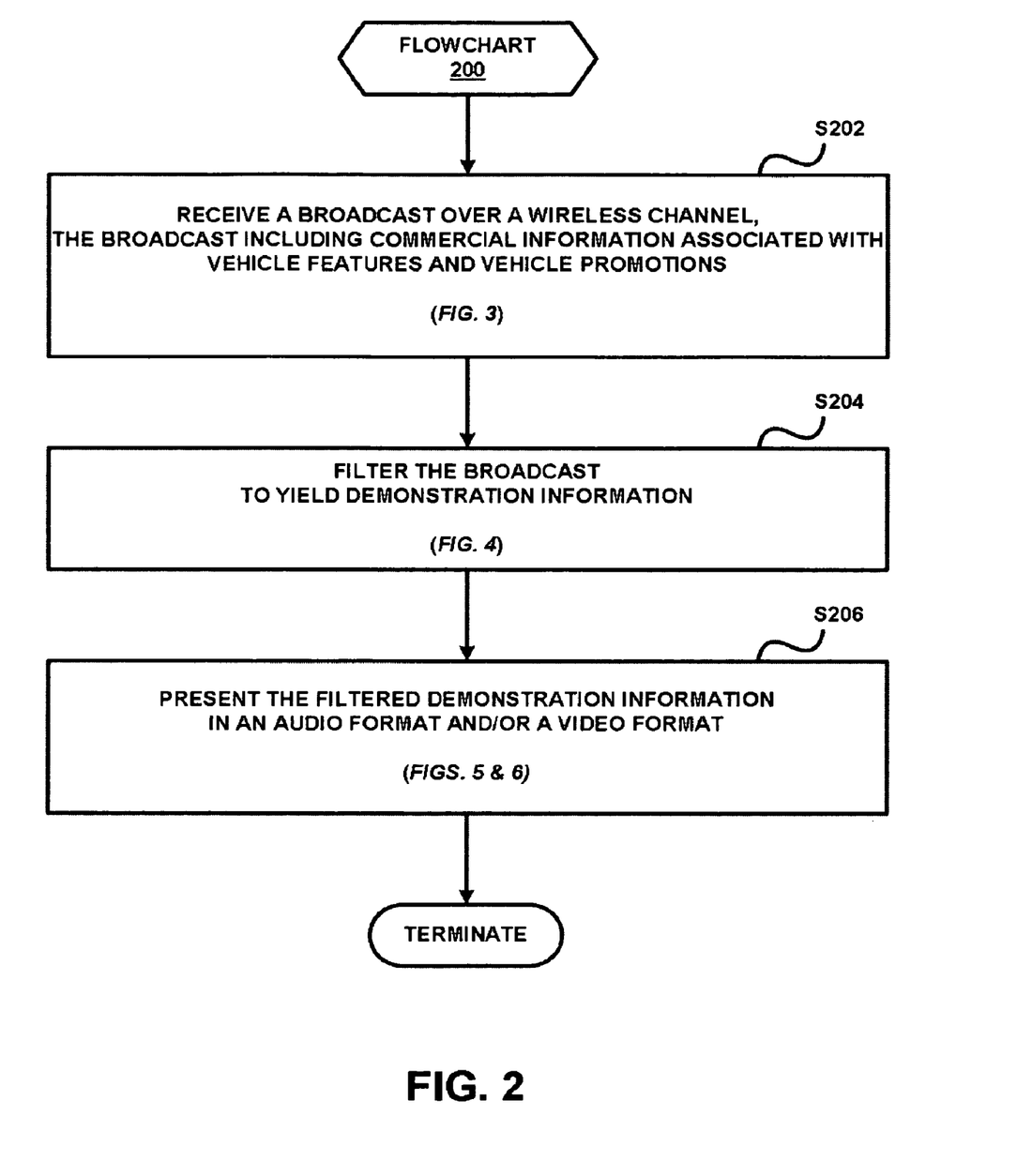
FIG. 2 illustrates one embodiment of a method for dynamically demonstrating vehicle features and vehicle promotions in accordance with the present invention.

FIG. 2 illustrates a flowchart 200 representative of a method of dynamically demonstrating vehicle features and vehicle promotions in accordance with present invention. For purposes of the present invention, the term "vehicle features" is broadly defined herein as any physical aspect and any operational aspect of a vehicle. Also for purposes of the present invention, the term "vehicle promotions" is broadly defined herein as any type of advertising, endorsing and the like directed to facilitating a purchasing, a driving and/or a servicing of the vehicle.

Referring to FIG. 2, flowchart 200 is executed by a telematics unit in a vehicle (e.g., telematics unit 120 shown in FIG. 1). A stage S202 of flowchart 200 encompasses the telematics unit receiving a broadcast over a wireless channel wherein the broadcast includes commercial information associated with the vehicle features and/or the vehicle promotions. For purposes of the present invention, the term "commercial information" is broadly defined herein as information related, directly or indirectly, to the vehicle features and the vehicle promotions.

Figure 3:
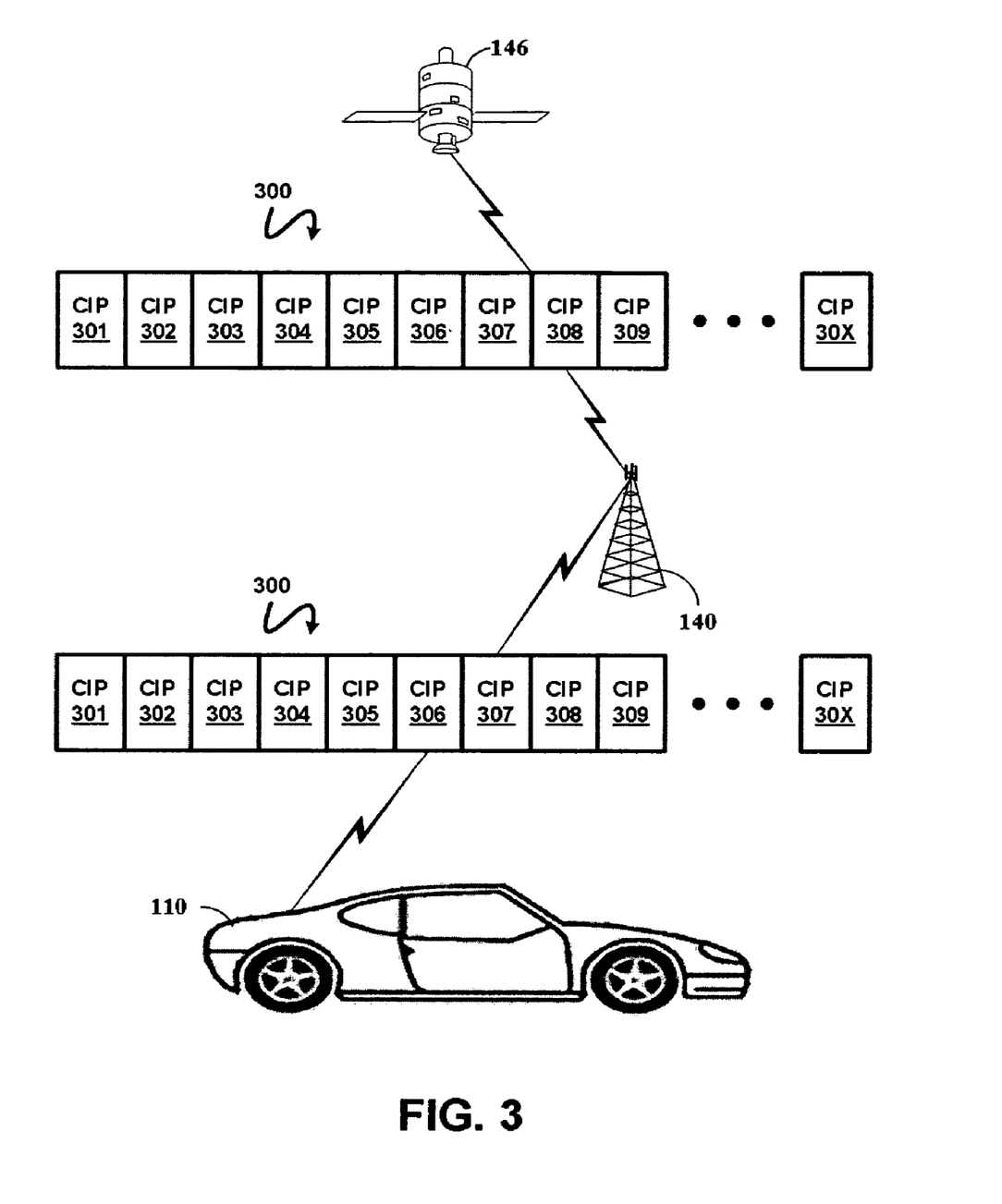
FIG. 3 illustrates an exemplary broadcast over a dedicated satellite radio channel in accordance with the present invention.

In one exemplary embodiment as illustrated in FIG. 3, a broadcast 300 is over a dedicated satellite radio channel where the broadcast includes up to X number of commercial information packets ("CIP"), where $X \geq 1$. Each commercial packet is associated with the features and promotions of a particular type of vehicle. Alternatively, a broadcast 300 can be received directly by a telematics unit without passing through a terrestrial repeater.

FIG. 3 illustrates broadcast 300 being transmitted to MVCU 110 (FIG. 1) from satellite 146 (FIG. 1).

Referring again to FIG. 2, a stage S204 of flowchart 200 encompasses the telematics unit filtering the broadcast to yield demonstration information that is Y percent of the commercial information in dependence upon the filtering technique implemented during stage S204, where Y>0 and $\leq 100$. In one exemplary embodiment as illustrated in FIG. 4, the telematics unit employs a filter 400 having nine (9) filter nodes 401-409 where broadcast 300 is passed through filtered nodes 401-409 to yield demonstration information ("DI") 500.

Figure 4:
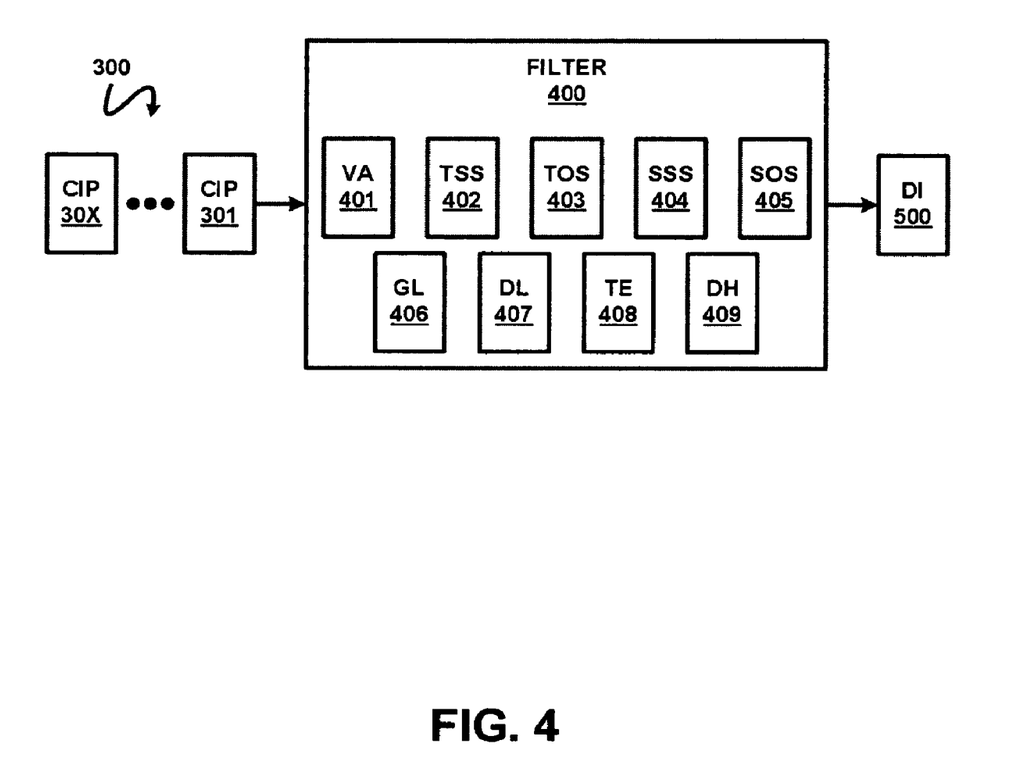
FIG. 4 illustrates one embodiment of a broadcast filter in accordance with the present invention.

Referring to FIG. 4, a first filter node is a vehicle architecture ("VA") filter node 401 structurally configured to separate commercial information from broadcast 300 that is related, directly or indirectly, to the architecture of the vehicle. A second filter node is a telematics subscription status ("TSS") filter node 402 structurally configured to separate commercial information from broadcast 300 that is related, directly or indirectly, to the telematics subscription status corresponding to the vehicle. Those having ordinary skill in the art will appreciate that the telematics subscription status can be in the form of a trial state, a fully paid state or a disabled state.

A third filter node is a telematics operating setting ("TOS") filter node 403 structurally configured to separate commercial information from broadcast 300 that is related, directly or indirectly, to the telematics operational settings as established by the subscriber. A fourth filter node is a satellite subscription status ("SSS") filter node 404 structurally configured to separate commercial information from broadcast 300 that is related, directly or indirectly, to the satellite subscription status corresponding to the vehicle.

Those having ordinary skill in the art will appreciate that the satellite subscription status can be in the form of a trial state, a fully paid state or a disabled state. A fifth filter node is a satellite operating setting ("SOS") filter node 405 structurally configured to separate commercial information from broadcast 300 that is related, directly or indirectly, to the satellite operational settings as established by the subscriber.

A sixth filter node is a geographic location ("GL") filter node 406 structurally configured to separate commercial information from broadcast 300 that is related, directly or indirectly, to the geographic location of the vehicle. A seventh filter node is a dealership location ("DL") filter node 407 structurally configured to separate commercial information from broadcast 300 that is related, directly or indirectly, to the geographic location of dealerships within a predetermined distance of the vehicle.

An eighth filter node is a trigger event ("TE") filter node 408 structurally configured to separate commercial information from broadcast 300 that is related, directly or indirectly, to one or more pre-defined trigger events for purchasing and/or servicing the vehicle. A final ninth filter node is a driving history ("DH") filter node 406 structurally configured to separate commercial information from broadcast 300 that is related, directly or indirectly, to the driving history of the vehicle (e.g., number of miles logged by vehicle).

Figure 5:
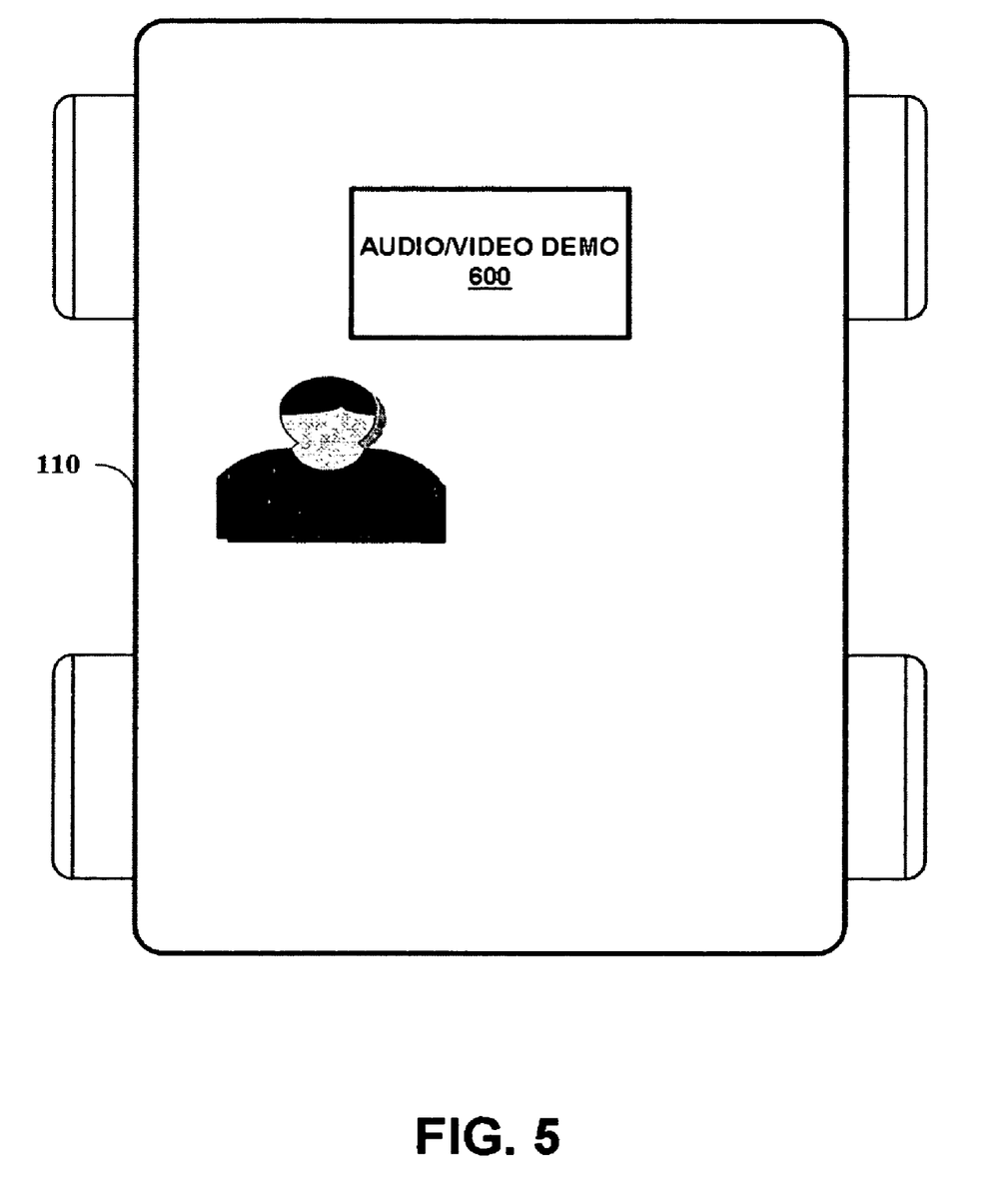
FIG. 5 illustrates a first exemplary demonstration of a vehicle in accordance with the present invention.
Figure 6:
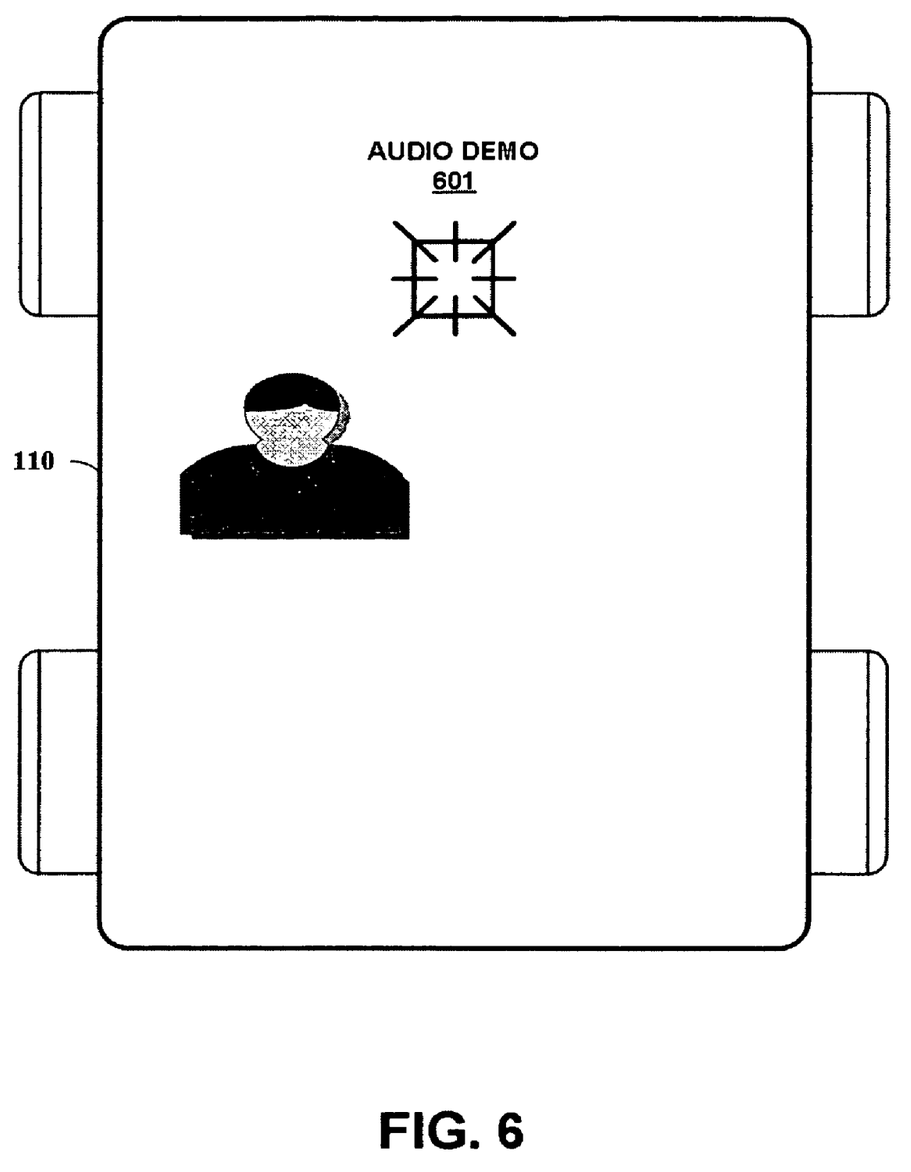
FIG. 6 illustrates a second exemplary demonstration of a vehicle in accordance with the present invention.

Referring again to FIG. 2, a stage S206 of flowchart 200 encompasses the telematics unit presenting the filtered demonstration information in an audio format and/or a video format. In one exemplary embodiment as illustrated in FIG. 5, an audio/video demo message 600 is developed from demonstration information 500 (FIG. 4) and presented to an occupant of the vehicle on a vehicle display. In another exemplary embodiment as illustrated in FIG. 6, an audio demo message 601 is developed from demonstration information 500 (FIG. 4) and presented to an occupant of the vehicle via a radio system.

Those having ordinary skill in the art will appreciate the numerous and varied advantages and benefits of the present invention from the description herein of FIGS. 2-6.

In one embodiment, a vehicle located at a dealership receives a SDARS broadcast, such as a broadcast from satellite 146. Based on a GPS location obtained from GPS unit 126, telematics unit 120 determines that at least a portion (termed the 'geographic portion') of the broadcast applies to the geographic location of the vehicle. Additionally, based on information stored in memory 128, telematics unit 120 determines that at least a portion of the broadcast (termed the 'particular portion') applies to the particular vehicle.

In response to determining that at least a portion of the broadcast is both a geographic portion and a particular portion, termed the vehicle-specific portion, the vehicle-specific portion is filtered from the broadcast, and played within the vehicle. Ideally, the vehicle-specific portion is played for a potential consumer or purchaser of the vehicle.

For example, the SDARS broadcast can contain specific features to be demonstrated by the vehicle during a testing session. For example, a vehicle salesperson may wish to demonstrate the power windows, power sunroof and power locks. An executable file, instructing the telematics unit to operate these vehicle modules, in order, can be parsed from the SDARS broadcast, and executed in the vehicle without interrupting the salesperson.

In one embodiment, the executable file will ensure that the vehicle is not currently moving, and in other embodiments, will prevent the vehicle from moving during execution of the executable file. In another embodiment, a promotion offered to a specific dealer differs from the promotions offered to another dealer, such that the geographically specific information will change. Therefore, a dealer can offer dealer-specific incentives, either based on a dealer offering, or on different manufacturer incentives.

In yet another example, a regional-specific channel can be broadcast from satellite 146. In one embodiment, a regional-specific channel broadcasts information relating to fuel requirements that are geographically mandated. In another embodiment, a regional-specific broadcast is linked to a predominant musical choice responsive to geography. For example, a predominant musical preference in one particular urban region is likely to differ from the predominant musical preference in a particular rural region.

In yet another embodiment, the SDARS broadcast can contain information about a particular driver, such as the driver's current vehicle, and can include comparisons between features of the driver's current vehicle and the prospective purchase/lease vehicle.

In another embodiment, a specific channel of information or entertainment is authorized for play in vehicles without a subscription, so long as the vehicles meet certain geographic and/or vehicle specific limitations. For example, a SDARS channel broadcasting bluegrass music can be authorized to play in all 2006 model year vehicles that are in or around a particular dealer's lot in an area known to have a prevalent population of bluegrass fans. In another example, the same bluegrass channel is authorized to play in the same area, but only in 2006 Model X vehicles.

Figure 7:
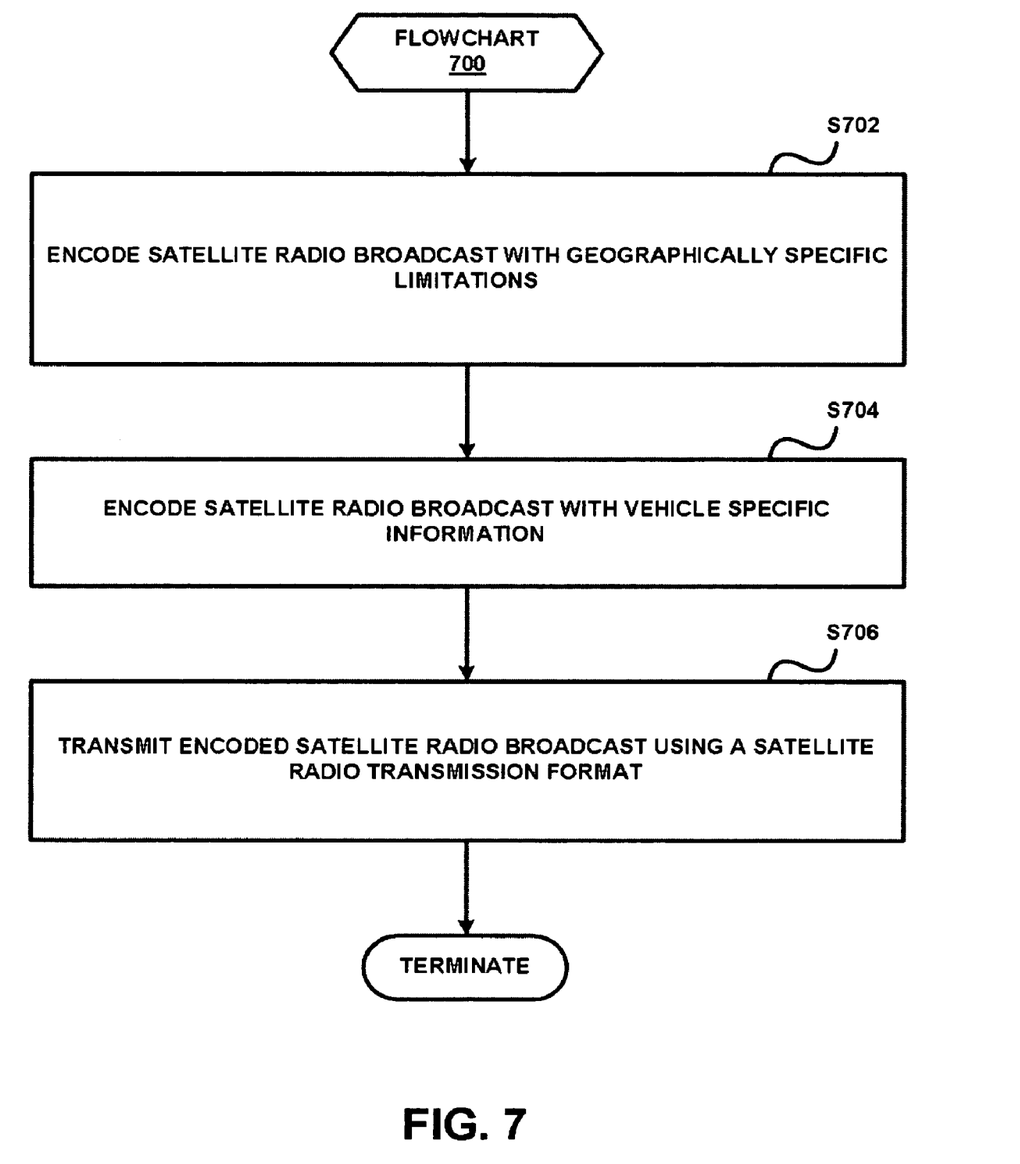
FIG. 7 illustrates another embodiment of a method for dynamically demonstrating vehicle features and vehicle promotions in accordance with the present invention.

Another aspect of the invention provides a method, illustrated at flowchart 700 in FIG. 7, for demonstrating vehicle features using satellite radio broadcasts. A satellite radio broadcast is encoded with geographically specific limitations to create an encoded satellite radio broadcast at stage S702. The geographically specific limitations may be limited to a particular political subdivision, such as a city or state, or the geographically specific limitations may be limited to a geographic region surrounding a business, such as a specified automobile dealership.

In one embodiment, the broadcast is further encoded with vehicle specific information, applicable to either a single vehicle or a plurality of vehicles meeting certain criteria, at stage S704. Vehicle specific information is, in one embodiment, limited to a single vehicle, or a single user of a vehicle. In another embodiment, vehicle specific information is limited to a single make of vehicle (such as all Pontiac vehicles), or to a single model of vehicle (such as all Pontiac Grand Am vehicles).

The broadcast is encoded with vehicle features to be demonstrated for a user, in one embodiment. The vehicle features may be described audibly, for playback over an audio system of the vehicle, or the vehicle features may be described visually, for playback over an audiovisual system of the vehicle. Alternatively, or additionally, the broadcast may be encoded with executable files with instructions to demonstrate vehicle functions in a predetermined order, with our without audible and/or visual accompaniment.

The encoded satellite radio broadcast is transmitted using a satellite radio transmission format at stage S706. The transmission may be transmitted with terrestrial repeaters or an orbital satellite. The encoded satellite radio broadcast is transmitted continually in one embodiment. In another embodiment, the encoded satellite radio broadcast is transmitted only in response to a trigger event, such as a request for the encoded satellite radio broadcast.

Figure 8:
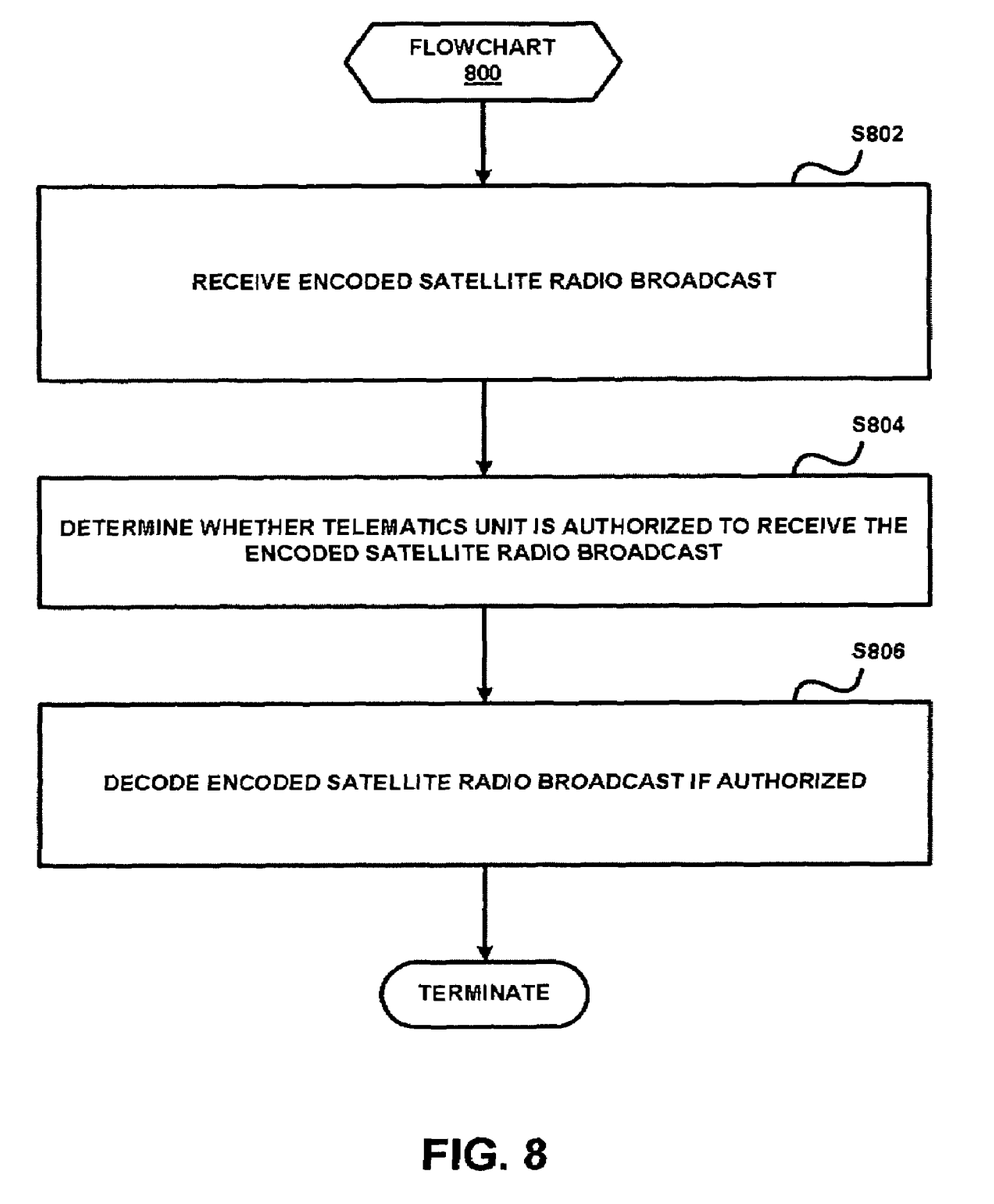
FIG. 8 illustrates another embodiment of a method for dynamically demonstrating vehicle features and vehicle promotions in accordance with the present invention.

The invention also provides a method for demonstrating vehicle features using satellite radio transmissions, as illustrated in flowchart 800 in FIG. 8. A satellite radio receiver in communication with a telematics unit, such as telematics unit 120, receives an encoded satellite radio broadcast at stage S802. The encoding of the encoded satellite radio broadcast indicates a geographical area in which vehicles are authorized to decode the contents of the encoded satellite radio broadcast. The telematics unit receives a geographical location from a GPS unit, such as GPS unit 126.

In response to receiving the encoded satellite radio broadcast and geographical location, the telematics unit determines whether the telematics unit is authorized to receive the encoded satellite radio broadcast at stage S804. If the current geographical location matches the encoded satellite radio broadcast requirements, the telematics unit decodes the encoded satellite radio broadcast, and executes any instructions that were encoded. For example, the encoded satellite radio broadcast may include audio and/or visual descriptions of vehicle features. Alternatively, the encoded satellite radio broadcast may include executable files to physically demonstrate at least one vehicle feature, such as power windows.

In the event that the telematics unit determines that the telematics unit is authorized to receive the encoded satellite radio broadcast, the telematics unit decodes the encoded satellite radio broadcast at stage S806. In response to the decoding, the telematics unit then takes any appropriate action depending on the contents of the decoded satellite radio broadcast. For example, the telematics unit may play a predetermined demonstration channel of music programmed by a SDARS service. Alternatively, the telematics unit executes the instructions contained in an executable file. In yet another example, the telematics unit plays a certain predetermined audiovisual file for the occupants of the vehicle.

The present invention may be embodied in other specific forms without departing from the spirit or essential characteristics. The described embodiments are to be considered in all respects only as illustrative and not restrictive.

What is claimed is:

1. A method for dynamically demonstrating vehicle features and vehicle promotions with demonstration information, the method comprising:

storing and updating a plurality of filter nodes that provides a basis to separate out the demonstration information from a larger body of commercial information, each of the plurality of filter nodes being selected and stored in a telematics unit in a vehicle with no direct input by a vehicle user, the telematics unit being programmed to update the plurality of filter nodes from data systems both outside and inside the vehicle;

receiving a broadcast over a wireless channel, wherein the broadcast includes the commercial information associated with at least one of the vehicle features and the vehicle promotions;

filtering the broadcast with at least one of the plurality of filter nodes to yield the demonstration information filtered to be individually relevant to the vehicle user, wherein the demonstration information is at least a portion of the commercial information, and wherein the demonstration information includes content selected from physical aspects of the user's vehicle, operational aspects of the user's vehicle, purchasing of the user's vehicle, driving of the user's vehicle, servicing of the user's vehicle and combinations thereof; and presenting the filtered demonstration information in at least one of an audio format, a video format, or one or more executable files.

2. The method of claim 1, wherein the wireless channel is a dedicated satellite radio channel.

3. The method of claim 1, wherein the filtering further includes:
filtering the broadcast with one of the plurality of filter nodes configured to separate information relating to an architecture of the vehicle.

4. The method of claim 1, wherein the filtering further includes:
filtering the broadcast with one of the plurality of filter nodes configured to separate information relating to at least one of a telematics subscription status associated with the vehicle and a telematics operational setting associated with the vehicle.

5. The method of claim 1, wherein the filtering further includes:
filtering the broadcast with one of the plurality of filter nodes configured to separate information relating to at least one of a satellite subscription status associated with the vehicle and a satellite operational setting associated with the vehicle.

6. The method of claim 1, wherein the filtering further includes:
filtering the broadcast with one of the plurality of filter nodes configured to separate information relating to a geographic location of the vehicle.

7. The method of claim 1, wherein the filtering further includes:
filtering the broadcast with one of the plurality of filter nodes configured to separate information relating to a dealership being located within a predetermined distance of the vehicle.

8. The method of claim 1, wherein the filtering further includes:
filtering the broadcast with one of the plurality of filter nodes configured to separate information relating to at least one trigger event.

9. The method of claim 1, wherein the filtering further includes:
filtering the broadcast with one of the plurality of filter nodes configured to separate information relating to a driving history of the vehicle.

10. The method of claim 1, wherein the presenting of the filtered demonstration information includes:
developing a demo message from the filtered demonstration information; and
presenting the demo message in at least one of the audio format and the video format.

11. A computer usable medium for dynamically demonstrating vehicle features and vehicle promotions, the computer usable medium comprising:
computer readable code for storing and updating a plurality of filter nodes that provides a basis to separate out the demonstration information from a larger body of commercial information, each of the plurality of filter nodes being selected and stored in a telematics unit in a vehicle with no direct input by a vehicle user, the telematics unit being programmed to update the plurality of filter nodes from data systems both outside and inside the vehicle;
computer readable code for receiving a broadcast over a wireless channel, wherein the broadcast includes the commercial information associated with at least one of the vehicle features and the vehicle promotions;
computer readable code for filtering the broadcast with at least one of the plurality of filter nodes to yield the demonstration information, filtered to be individually relevant to the vehicle user, wherein the demonstration information is at least a portion of the commercial information, and wherein the demonstration information includes content selected from physical aspects of the user's vehicle, operational aspects of the user's vehicle, purchasing of the user's vehicle, driving of the user's vehicle, servicing of the user's vehicle and combinations thereof; and
computer readable code for presenting the filtered demonstration information in at least one of an audio format, a video format, or one or more executable files.

12. The computer usable medium of claim 11, wherein the computer readable code for filtering further includes:
computer readable code for filtering the broadcast with one of the plurality of filter nodes configured to separate information relating to an architecture of the vehicle.

13. The computer usable medium of claim 11, wherein the computer readable code for filtering further includes:
computer readable code for filtering the broadcast with one of the plurality of filter nodes configured to separate information relating to at least one of a telematics subscription status associated with the vehicle and a telematics operational setting associated with the vehicle.

14. The computer usable medium of claim 11, wherein the computer readable code for filtering further includes:
computer readable code for filtering the broadcast with one of the plurality of filter nodes configured to separate information relating to at least one of a satellite subscription status associated with the vehicle and a satellite operational setting associated with the vehicle.

15. The computer usable medium for claim 11, wherein the computer readable code for filtering further includes:
computer readable code for filtering the broadcast with one of the plurality of filter nodes configured to separate information relating to a geographic location of the vehicle.

16. The computer usable medium of claim 11, wherein the computer readable code for filtering further includes:
computer readable code for filtering the broadcast with one of the plurality of filter nodes configured to separate information relating to dealership being located within a predetermined distance of the vehicle.

17. The computer usable medium of claim 11, wherein the computer readable code for filtering further includes:
computer readable code for filtering the broadcast with one of the plurality of filter nodes configured to separate information relating to at least one trigger event.

18. The computer usable medium of claim 11, wherein the computer readable code for filtering further includes:
computer readable code for filtering the broadcast with one of the plurality of filter nodes configured to separate information relating to a driving history of the vehicle.

19. A system for dynamically demonstrating vehicle features and vehicle promotions, the system comprising:
means for storing and updating a plurality of filter nodes that provides a basis to separate out the demonstration information from a larger body of commercial information, each of the plurality of filter nodes being selected and stored in a telematics unit in a vehicle with no direct input by a vehicle user, the telematics unit being programmed to update the plurality of filter nodes from data systems both outside and inside the vehicle;

means for receiving a broadcast over a wireless channel, wherein the broadcast includes the commercial information associated with at least one of the vehicle features and the vehicle promotions from the broadcast;

means for filtering the broadcast to yield demonstration information, wherein the demonstration information, filtered to be individually relevant to the vehicle user, is at least a portion of the commercial information, wherein the demonstration information includes content selected from physical aspects of the user's vehicle, operational aspects of the user's vehicle, purchasing of the user's vehicle, driving of the user's vehicle, servicing of the user's vehicle and combinations thereof; and means for presenting the filtered demonstration information in at least one of an audio format, a video format, or one or more executable files.

20. The system of claim 19, wherein the filtered demonstration information includes at least one of vehicle feature information and vehicle purchase incentive information to thereby persuade a person to purchase the vehicle, vehicle service information, and service dealership information to thereby inform a person of an appropriate service for the vehicle.

21. The method of claim 1 wherein the filtered demonstration information is presented via the one or more executable files, and wherein the method further comprises instructing the telematics unit to operate a predetermine vehicle module in response to the one or more executable files.

* * * * *